United States Patent Office 2,761,879
Patented Sept. 4, 1956

2,761,879

HALO-SUBSTITUTED BICYCLIC ALDEHYDES

Samuel B. Soloway, Denver, Colo., assignor to Shell Development Company, New York, N. Y., a corporation of Delaware No Drawing. Application March 14, 1955,
Serial No. 494,276

5 Claims. (Cl. 260—598)

This invention pertains to certain new chemical compounds and it more particularly pertains to certain novel halogen-substituted polycyclic aldehydes.

The new aldehydes provided by the invention have the structural formula

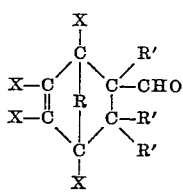

in which each X represents a middle halogen, i. e. bromine or chlorine, R represents a methano (—CH$_2$—) or a dihalomethano (—CX$_2$—) radical and each R' represents the hydrogen atom or a lower alkyl group, that is, a methyl, ethyl, n-propyl, isopropyl, butyl or pentyl group. In the preferred compounds each X represents chlorine and the compounds wherein R is the dichloromethano group are particularly desirable.

These novel aldehydes are readily prepared by reacting together a hexachloro-1,3-cyclopentadiene wherein the halogens are middle halogens, or a 1,2,3,4-tetrahalo-1,3-cyclopentadiene wherein the halogens are middle halogens, and a lower 2-alkenal to produce a 1:1 adduct of the two reactants. 1,4,5,6,7,7 - hexachloro - 2,3 - dimethyl-bicyclo(2.2.1)-5-heptene-2-carboxaldehyde is prepared in this manner from hexachloro-1,3-cyclopentadiene and alpha-methylcrotonaldehyde; 1,4,5,6,7,7-hexachloro-2-methylbicyclo(2.2.1)-5-heptene - 2 - carboxaldehyde is prepared from hexachloro-1,3-cyclopentadiene and methacrolein; 1,4,5,6,7,7-hexachloro - 3 - methylbicyclo(2.2.1) - 5 - heptene - 2 - carboxaldehyde is prepared from hexachloro-1,3-cyclopentadiene and crotonaldehyde; 1,4,5,6 - tetrachlorobicyclo(2.2.1)-5-heptene-2-carboxaldehyde is prepared from 1,2,3,4-tetrachloro-1,3-cyclopentadiene and acrolein; 1,4,5,6,7,7-hexabromobicyclo(2.2.1)-5-heptene-2-carboxaldehyde is prepared from hexabromo - 1,3 - cyclopentadiene and acrolein; 1,4,5,6,7,7 - hexachloro - 2 - neopentylbicyclo(2.2.1)-5-heptene-2-carboxaldehyde is prepared from hexachloro-1,3-cyclopentadiene and alpha-neopentylacrolein; 1,4,5,6-tetrabromo-2-methylbicyclo(2.2.1)-5-heptene-2-carboxaldehyde is prepared from 1,2,3,4-tetrabromo-1,3-cyclopentadiene and methacrolein; and 1,4,5,6,7,7 - hexabromo-2,3-dimethylbicyclo(2.2.1)-5-heptene-2-carboxaldehyde is prepared from hexabromo-1,3-cyclopentadine and alpha-methylcrotonaldehyde. The preferred species, 1,4,5,6,7,-7-hexachlorobicyclo(2.2.1)-5-heptene-2 - carboxaldehyde, is prepared similarly from hexachloro - 1,3 - cyclopentadiene and acrolein.

Tetrachlorocyclopentadienes that are utilized in preparing certain of the novel products of the invention can be prepared by reduction of corresponding hexahalocyclopentadienes with nascent hydrogen, for example by treatment with a zinc-copper couple in the presence of hydrochloric acid.

The reaction of the polyhalogenocyclopentadiene and the 2-alkenal can be carried out by heating the two reactants together, in the presence of an inert solvent if desired, in approximately the theoretical proportions, that is, in a mole ratio of from about 2:1 to about 1:2. The reaction can be carried out at the reflux temperature of the mixture, or higher temperatures, up to about 200° C., may be used with the aid of an autoclave or other closed system. The reaction conveniently is followed by observation of the boiling point of the mixture which increases as the reaction progresses. At the conclusion of the reaction the desired product may be recovered by distilling off any unconsumed starting materials and then either distilling, extracting or crystallizing the novel aldehyde from the remaining mixture. The yields of the desired product typically are good, 80% of theory and better.

The new aldehydes of this invention are of particular interest as chemical intermediates for the production of derivatives which have been found to have great value as plant growth regulators. More specifically, by treatment of these novel aldehydes with malonic acid in the presence of an amine, such as pyridine and piperidine, according to the Doebner reaction, there are obtained novel unsaturated acids, exemplified by 1,4,5,6,7,7-hexachlorobicyclo(2.2.1)-5-heptene-2-acrylic acid and 1,4,5,6-tetrachlorobicyclo(2.2.1)-5-heptene - 2 - acrylic acid, that exhibit high anti-auxin activity and that are valuable for defoliation of peach trees, cotton plants and other agriculturally important crops. Additionally, the novel aldehydes of this invention are useful as resin intermediates, such as by condensation with phenols, to produce bis-phenols which can be condensed with epihalohydrins to produce useful epoxide resins. The new aldehydes also can be reacted with phosphorus pentahalides, such as PCl$_5$, to produce valuable hexahalobicyclo(2.2.1)-5-hepten-2-ylmethylidene halides, such as 1,4,5,6,7,7-hexachlorobicycle(2.2.1)-5-hepten-2-ylmethylidene chloride.

As an example of the preparation of the novel aldehydes of this invention, there were mixed 409.5 grams of hexachloro-1,3-cyclopentadiene (1.5 moles) and 112 grams of acrolein (2.0 moles) and the mixture was heated at reflux. After about 20 hours of heating it contained copious amounts of yellow crystalline solid. After an additional 24 hours refluxing the mixture was cooled to room temperature and the unreacted acrolein was distilled off under a pressure of 20–50 millimeters mercury. Unconsumed hexachlorocyclopentadiene was distilled off under high vacuum. 1,4,5,6,7,7 - hexachlorobicyclo (2.2.1)-5-heptene-2-carboxaldehyde was recovered from the remaining crude black residue by sublimation at a temperature of 175° C. and 1.0 millimeter mercury pressure to recover 413 grams of product as a pale yellow, waxy, crystalline solid. Melting point of the product was approximately 145–8° C. Analyses: found, 29.3% C, 1.1% H, 64.9% Cl; calculated for C$_8$H$_4$Cl$_6$O, 29.2% C, 1.2% H, 64.7% Cl.

In a similar manner, 1,2,3,4-tetrachloro-1,3-cyclopentadiene and acrolein were reacted to produce in good yields the 1:1 adduct, 1,4,5,6-tetrachlorobicyclo(2.2.1)-5-heptene - 2 - carboxaldehyde; boiling point 90–1° C. under 0.5 millimeter mercury pressure; refractive index ($n$ 24/D) 1.5436. Analyses: found, 37.5% C, 2.63% H, 53.6% Cl; calculated for C$_8$H$_6$Cl$_4$O, 36.9% C, 2.31% H, 54.6% Cl.

For preparing the above-mentioned unsaturated acids from the novel aldehydes of this invention by the Doebner synthesis, the aldehydes have been treated with an excess of malonic acid in the presence of mixtures of pyridine and piperidine at about the reflux temperature of the mixture. After evolution of carbon dioxide ceased, the unsaturated acids were recovered by washing the crude product with aqueous acid, extracting the washed product with ether, treating the ether extract with aqueous caustic, and springing the acid from the caustic extract. Tests of 1,4,5,6,7,7-hexachlorobicyclo(2.2.1)-5-heptene-2-acrylic acid on coleoptile sections of maize growing in a 0.05 part per million solution of indoleacetic acid showed the substituted acrylic acid to have an activity approximately 20 times that of coumarin in inhibiting the growth rate. The growth inhibition was reversible by increased concentrations of indoleacetic acid, indicating that the substituted acrylic acid acted as an auxin antagonist. When sprayed onto branches of mature peach trees in the form of a 10% xylene-mineral oil emulsion in water containing approximately 1.1 grams of 1,4,5,6,7,7 - hexachlorobicyclo(2.2.1) - 5 - heptene - 2-acrylic acid per liter of emulsion, 100% defoliation resulted within three days after application. Similar results were obtained with analogous polyhalobicycloheptadiene acrylic acids prepared from the novel aldehydes of this invention.

I claim as my invention:

1. As a chemical compound, an aldehyde having the structure represented by the formula

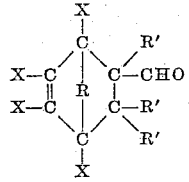

in which each X represents a halogen selected from the group consisting of bromine and chlorine, R represents one of the class consisting of —$CH_2$— and —$CX_2$— and each R' represents one of the class consisting of hydrogen and lower alkyl.

2. As a chemical compound, an aldehyde having the structure represented by the formula

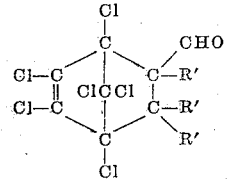

in which each R' represents one of the class consisting of hydrogen and lower alkyl.

3. As a chemical compound, an aldehyde having the structure represented by the formula

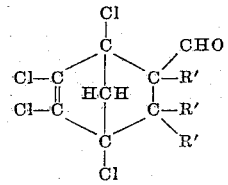

in which each R' represents one of the class consisting of hydrogen and lower alkyl.

4. As a chemical compound, 1,4,5,6,7,7-hexachlorobicyclo(2.2.1)-5-heptene-2-carboxaldehyde.

5. As a chemical compound, 1,4,5,6-tetrachlorobicyclo(2.2.1)-5-heptene-2-carboxaldehyde.

References Cited in the file of this patent

UNITED STATES PATENTS

| | | |
|---|---|---|
| 2,407,508 | Morris et al. | Sept. 10, 1946 |
| 2,556,665 | Smith et al. | June 12, 1951 |